United States Patent
Nagura

(10) Patent No.: US 10,215,596 B2
(45) Date of Patent: Feb. 26, 2019

(54) POSITION DETECTION APPARATUS, LENS APPARATUS, IMAGE PICKUP SYSTEM, MACHINE TOOL APPARATUS, EXPOSURE APPARATUS, POSITION DETECTION METHOD, AND NON-TRANSITORY COMPUTER-READABLE STORAGE MEDIUM WHICH ARE CAPABLE OF DETECTING REFERENCE POSITION WITH HIGH ACCURACY

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 147 days.

(21) Appl. No.: 14/992,385

(22) Filed: Jan. 11, 2016

(65) Prior Publication Data
US 2016/0209247 A1 Jul. 21, 2016

(30) Foreign Application Priority Data

Jan. 16, 2015 (JP) ................. 2015-006643
Nov. 16, 2015 (JP) ................. 2015-223899

(51) Int. Cl.
*G01D 5/34* (2006.01)
*G01D 5/347* (2006.01)
*G01D 5/245* (2006.01)

(52) U.S. Cl.
CPC ....... *G01D 5/34746* (2013.01); *G01D 5/2457* (2013.01); *G01D 5/34715* (2013.01)

(58) Field of Classification Search
CPC ............ G01D 5/34746; G01D 5/2457; G01D 5/34715
USPC .......................................... 250/231.1–231.18
See application file for complete search history.

(56) References Cited

U.S. PATENT DOCUMENTS

| | | | | |
|---|---|---|---|---|
| 5,059,791 A | * | 10/1991 | Ishizuka | G01D 5/38 250/231.17 |
| 6,713,756 B2 | * | 3/2004 | Yamamoto | G01D 5/34715 250/231.13 |
| 2002/0014581 A1 | * | 2/2002 | Yamamoto | G01D 5/34715 250/231.13 |

(Continued)

FOREIGN PATENT DOCUMENTS

| | | |
|---|---|---|
| JP | H07134048 A | 5/1995 |
| JP | H07191805 A | 7/1995 |

(Continued)

OTHER PUBLICATIONS

Office Action issued in Japanese Application No. 2015-223899 dated Aug. 7, 2018. English translation provided.

*Primary Examiner* — Seung C Sohn
(74) *Attorney, Agent, or Firm* — Rossi, Kimms & McDowell LLP

(57) ABSTRACT

A position detection apparatus detects a position of an object, and the position detection apparatus includes a detector, a scale having a periodic pattern, the scale and the detector being movable relatively to each other, and a signal processor configured to generate a reference signal indicating a reference position of the scale, and the signal processor is configured to generate the reference signal based on a ratio of a first phase signal and a second phase signal from the detector.

17 Claims, 11 Drawing Sheets

(56) References Cited

U.S. PATENT DOCUMENTS

| | | | | |
|---|---|---|---|---|
| 2013/0099105 A1* | 4/2013 | Nakamura | ............ | G01D 5/347 250/231.1 |
| 2015/0115142 A1* | 4/2015 | Yonezawa | ............ | G01B 11/14 250/231.1 |
| 2015/0362344 A1* | 12/2015 | Kimura | ............ | G01D 5/34715 250/231.1 |

FOREIGN PATENT DOCUMENTS

| JP | 10300518 A | 11/1998 |
|---|---|---|
| JP | 2006053309 A | 2/2006 |
| JP | 2014178227 A | 9/2014 |
| JP | 2016003945 A | 1/2016 |

\* cited by examiner

POSITION DETECTION APPARATUS, LENS APPARATUS, IMAGE PICKUP SYSTEM, MACHINE TOOL APPARATUS, EXPOSURE APPARATUS, POSITION DETECTION METHOD, AND NON-TRANSITORY COMPUTER-READABLE STORAGE MEDIUM WHICH ARE CAPABLE OF DETECTING REFERENCE POSITION WITH HIGH ACCURACY

BACKGROUND OF THE INVENTION

Field of the Invention

The present invention relates to a position detection apparatus which detects a position of an object.

Description of the Related Art

Previously, an encoder is used as a position detection apparatus provided in a machine tool, an FA equipment, or the like. In an incremental encoder, a reference point is detected by using a reference position mark provided at a specific position on a scale, and a position within a stroke is detected based on a moving amount relative to the reference point.

Japanese Patent Laid-open No. H10-300518 discloses a method of detecting a reference point on a scale. In the method disclosed in Japanese Patent Laid-open No. H10-300518, a solitary wave which is generated at a reference position on the scale is used, and a reference position pulse is generated based on a result obtained by comparing the solitary wave with a threshold value. Furthermore, a level of the threshold value changes with the increase or decrease of a direct-current component of a light amount.

However, in the method disclosed in Japanese Patent Laid-open No. H10-300518, a pulse position or a pulse width of a reference signal which indicates the reference position varies when a ratio of the direct-current component of the light amount and a modulation amplitude of the solitary wave is changed. As the direct-current component of the light amount, there are an external light component, an internal reflection of a sensor, a scatter component, and the like, in addition to a reflection component from the scale. Accordingly, since the ratio of the direct-current component and the modulation amplitude of the solitary wave varies depending on a change of an intensity distribution with the change of an environmental temperature or a state of a brightness, it is difficult to detect the reference position with high accuracy.

SUMMARY OF THE INVENTION

The present invention provides a position detection apparatus, a lens apparatus, an image pickup system, a machine tool apparatus, an exposure apparatus, a position detection method, and a non-transitory computer-readable storage medium which are capable of detecting a reference position with high accuracy independently of environmental change or temporal change.

A position detection apparatus as one aspect of the present invention detects a position of an object, and the position detection apparatus includes a detector, a scale having a periodic pattern, the scale and the detector being movable relatively to each other, and a signal processor configured to generate a reference signal (reference position signal) indicating a reference position of the scale, and the signal processor is configured to generate the reference signal based on a ratio of a first phase signal and a second phase signal from the detector.

A lens apparatus as another aspect of the present invention includes a lens movable in an optical axis direction and the position detection apparatus configured to detect a position of the lens.

An image pickup system as another aspect of the present invention includes the lens apparatus, and an image pickup apparatus including an image pickup element configured to photoelectrically convert an optical image formed via the lens.

A machine tool apparatus as another aspect of the present invention includes a machine tool including at least one of a robot arm and a conveyer configured to convey an object to be assembled, and the position detection apparatus configured to detect at least one of a position and an attitude of the machine tool.

An exposure apparatus as another aspect of the present invention includes a stage configured to mount a semiconductor wafer to be movable in a two-dimensional direction, and a position detection apparatus configured to detect a position of the stage, A position detection method as another aspect of the present invention detects a position of an object which moves integrally with a scale or a detector based on an output signal from the detector, the scale having a periodic pattern, and the scale and the detector being movable relatively to each other, the method includes the steps of acquiring a first phase signal and a second phase signal from the detector, and generating a reference signal indicating a reference position of the scale based on a ratio of the first phase signal and the second phase signal.

A non-transitory computer-readable storage medium as another aspect of the present invention stores a program which causes a computer to execute the position detection method.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
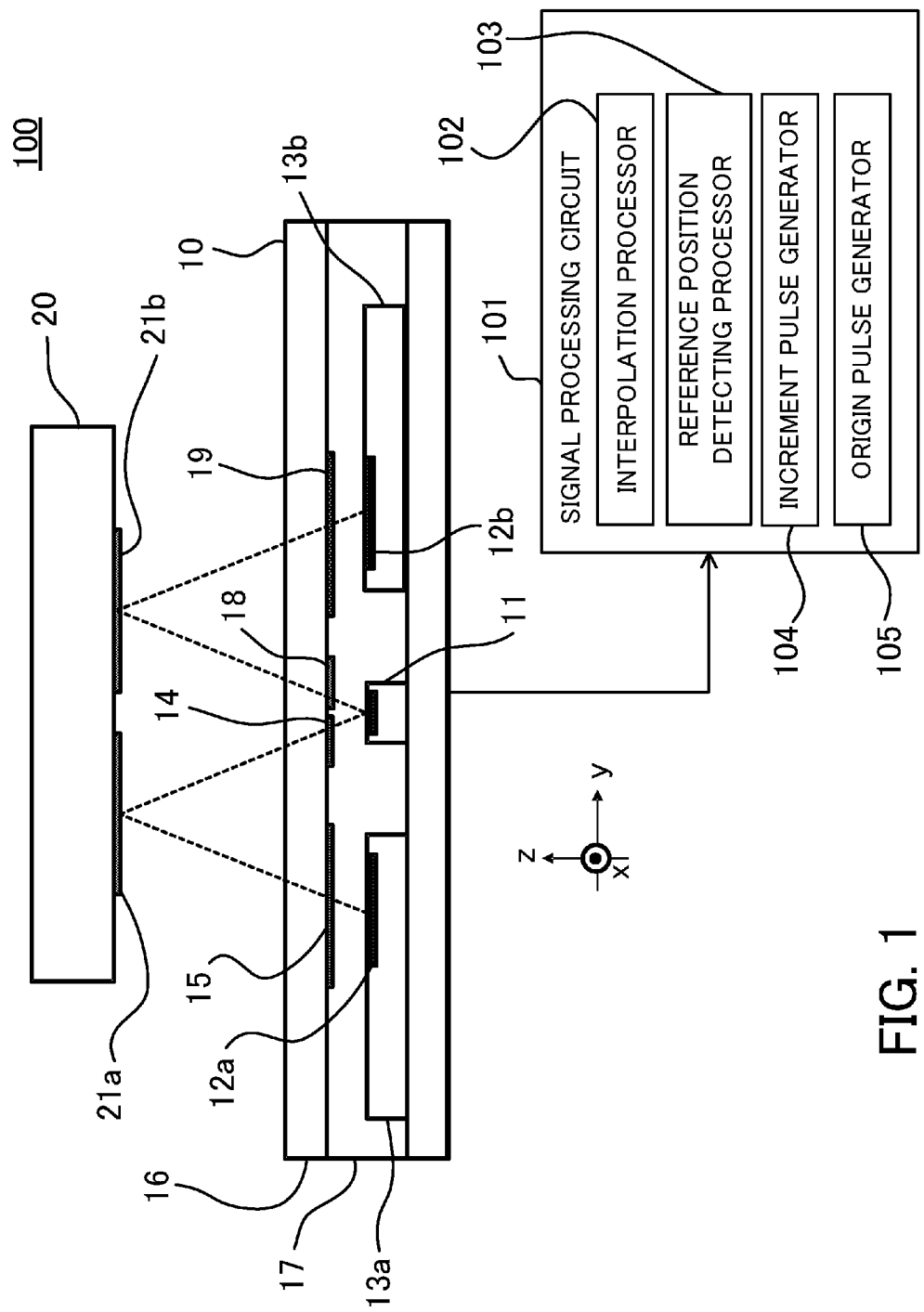
FIG. 1 is a configuration diagram of a position detection apparatus (optical encoder) in a first embodiment.

First of all, referring to FIG. 1, a position detection apparatus (optical encoder) in a first embodiment will be described. FIG. 1 is a configuration diagram of a position detection apparatus 100 in this embodiment. The position detection apparatus 100 includes a scale 20 attached to a movable portion (object), a sensor unit 10 (detection unit) as a detector attached to a fixed portion, and a signal processing circuit 101 (signal processor).

The signal processing circuit 101 includes an interpolation processor 102, a reference position detecting processor 103, an increment pulse generator 104, and an origin pulse generator 105. The reference position detecting processor 103 and the origin pulse generator 105 function as a reference point generator. The interpolation processor 102 and the increment pulse generator 104 function as a pulse generator. The interpolation processor 102 performs interpolation processing on an encoder signal (position detection signal) obtained from the sensor unit 10. The reference position detecting processor 103 performs detection processing of a reference position on the scale 20. The increment pulse generator 104 generates an increment pulse. The origin pulse generator 105 generates an origin pulse.

The sensor unit 10 is a light emitting and receiving sensor unit which includes a light source 11 including for example an LED, a light receiving IC 13a including a light receiving element array 12a, and a light receiving IC 13b including a light receiving element array 12b mounted in a package. The scale 20 is provided with a chromium reflection film as scale tracks 21a and 21b formed (patterned) on a glass substrate.

A light source grating 14 is provided as a transmission type diffraction grating configured by transmission portions and light shielding portions arrayed alternately in a position detection direction (X direction) in an optical path from a light source 11 (light emitting device) in the sensor unit 10 toward the scale track 21a. A slit opening 18 whose opening width in the position detection direction is restricted by the light shielding portion is provided in an optical path from the light source 11 toward the scale track 21b. A detection grating 15 is provided in an optical path from the scale track 21a toward the light receiving element array 12a. The detection grating 15 is a transmission type diffraction grating configured by transmission portions and light shielding portions arrayed alternately in the position detection direction. A random grating 19 configured by transmission portions and light shielding portions arrayed alternately in the position detection direction and formed at unequal intervals in an optical path from the scale track 21b toward the light receiving element array 12b.

Each of the light source grating 14, the slit opening 18, the detection grating 15, and the random grating 19 is provided by forming a chromium film as transmission portions on a surface of the cover glass 16. The cover glass 16 is bonded to a transmissive resin 17 which seals the light source 11 and the light receiving ICs 13a and 13b, and it is optically integrated with the light source 11 and the light receiving ICs 13a and 13b.

Figure 2:
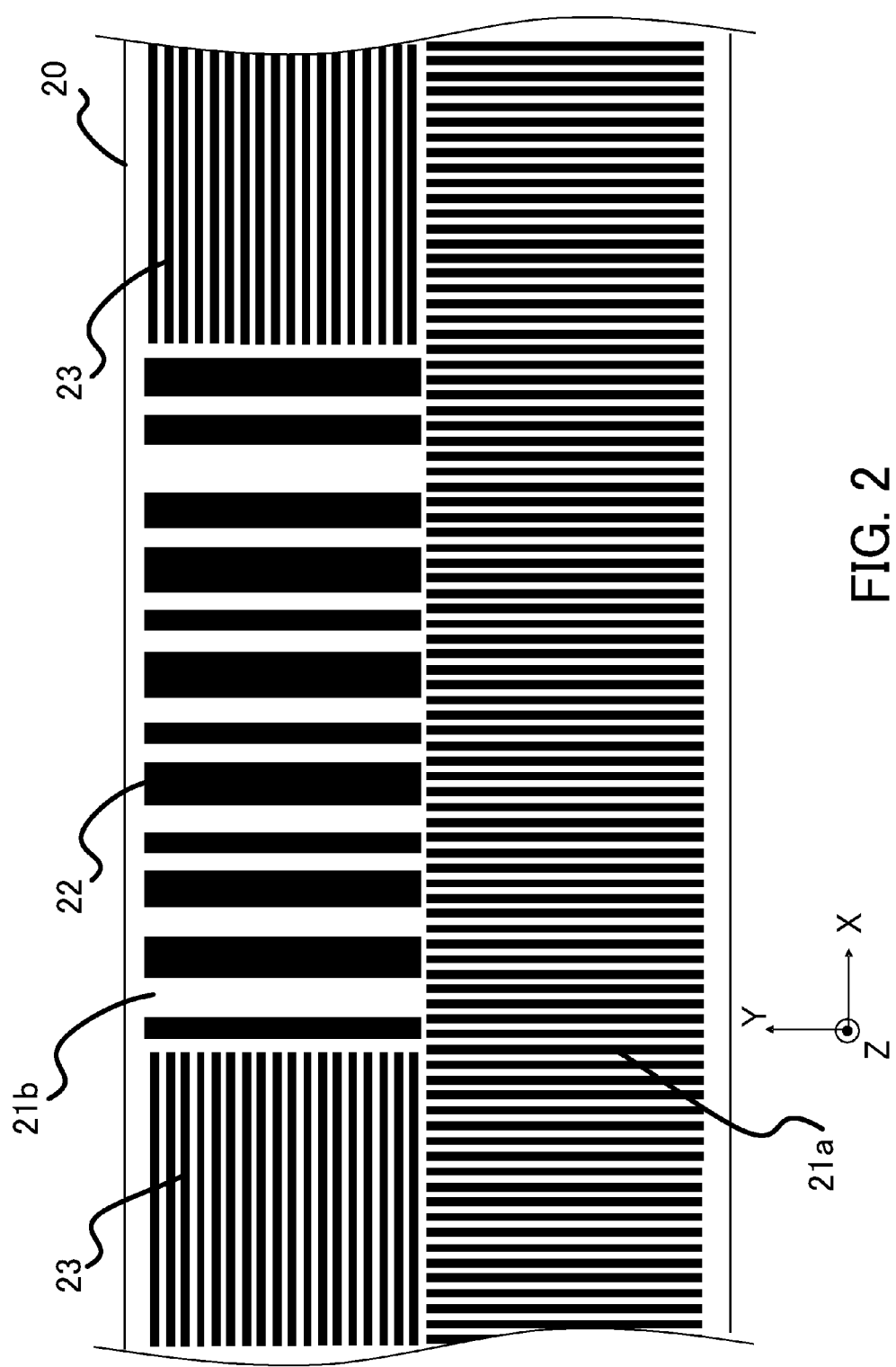
FIG. 2 is a plan view of a scale in each of first and second embodiments.

Next, referring to FIG. 2, the configuration of the scale tracks 21a and 21b on the scale 20 will be described. FIG. 2 is an enlarged plan view of a part of the scale 20 (scale tracks 21a and 21b). The scale track 21a includes a pattern array in which a reflection film pattern with a width of 2 μm is formed at a pitch P2 (=4 μm) in a moving direction (X direction). The scale track 21b arranged in parallel to the scale track 21a is provided with a reference position mark 22 in which reflection portions and non-reflection portions are arranged on a specific position (reference position) on the scale 20 at unequal intervals in the moving direction (X direction). For example, as the reference position mark 22, a pseudo random code such as an M-sequence, or an array obtained by replacing a part of a code on which a Manchester coding has been performed with reflection portions and non-reflection portions can be applied.

A halftone 23 including reflection portions and non-reflection portions with an area ratio of 1:1 is formed in a region other than the reference position mark 22 on the scale track 21b. The halftone 23 is formed at a sufficiently fine period so that an output is not modulated according to a relative displacement between the sensor unit 10 and the scale 20. In this embodiment, the halftone includes a pattern array in which reflection film patterns with a width of 2 μm are arranged at a pitch P (=4 μm) in a direction (Y direction) perpendicular to the moving direction.

Figure 3:
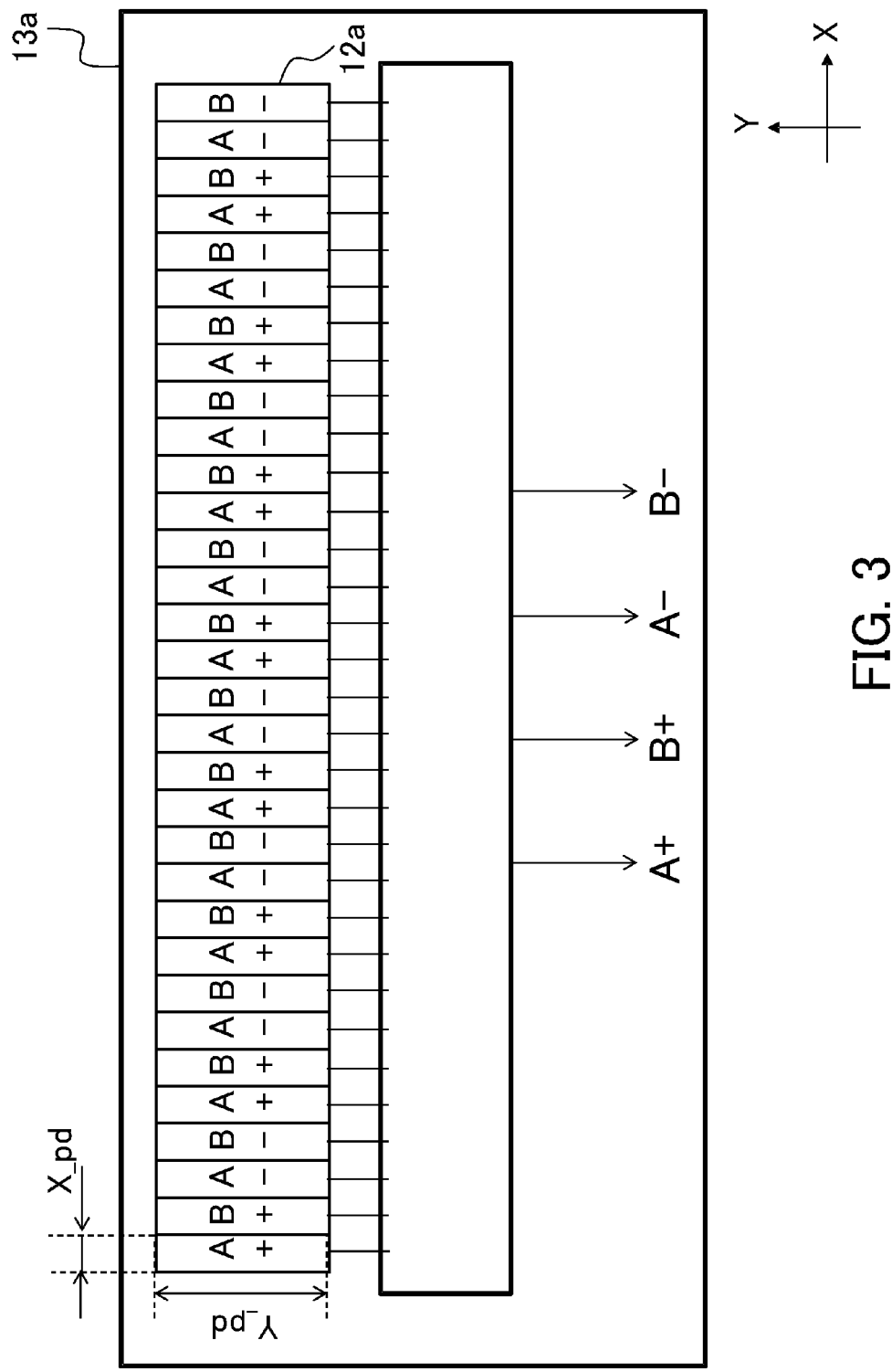
FIG. 3 is a plan view of a light receiving element array of a light receiving IC in each of the first and second embodiments.

Subsequently, referring to FIG. 3, the arrangement of the light receiving element array 12a of the light receiving IC 13a will be described. FIG. 3 is a plan view of the light receiving element array 12a, and it illustrates the arrangement of a light receiving surface of the light receiving element array 12a. In the light receiving element array 12a, 32 light receiving elements are arrayed in the position detection direction (X direction) in line. With respect to a single light receiving element, a width X_pd in the position detection direction (X direction) is 64 μm and a width Y_pd in a direction (Y direction) perpendicular to the position detection direction is 450 μm.

The 32 light receiving elements are cyclically allocated in order of A+ phase, B+ phase, A− phase, and B− phase, and eight light receiving elements allocated as each phase of the four phases constitute a light receiving element group. The eight light receiving elements constituting each light receiving element group are electrically connected to each other, and an output (current) of each of the light receiving elements is added to each other to be input to an I-V conversion amplifier (not illustrated) provided for each phase at the latter stage. Four I-V conversion amplifiers output four-phase signals S1(A+), S1(B+), S1(A−), and S1(B−), respectively.

The signals S1(A+), S1(B+), S1(A−), and S1(B−) become voltage signals (sine wave signals) which change in a sine wave shape according to a movement of the scale 20. The output signals of the four I-V conversion amplifiers provided for the four phases correspond to 0, 90, 180, and 270 degrees of a signal phase, respectively. The signal processing circuit 101 performs calculation processing represented by the following expressions (1) and (2) on the four-phase signals S1(A+), S1(B+), S1(A−), and S1(B−) to be converted into two-phase sine wave signals S1(A) and S1(B) (position information) in which direct-current (DC) components have been removed from the four-phase signals.

$$S1(A) = S1(A+) - S1(A-) \tag{1}$$

$$S1(B) = S1(B+) - S1(B-) \tag{2}$$

The signal processing circuit 101 performs calculation represented by the following expression (3) to acquire a phase signal Φ1 as a basis of a position signal.

$$\Phi1 = A\,\text{TAN}\,2[S1(A), S1(B)] \quad (3)$$

In expression (3), symbol A TAN 2[Y,X] is an arctangent function that determines a quadrant to convert the phase into a phase of 0 to 2π.

Subsequently, interpolation processing which is performed by the interpolation processor 102 and the increment pulse generator 104 (pulse generator) will be described. When the number of division of the interpolation by the interpolation processor 102 is n, increment pulses A and B are processed as outputs represented by the following expressions (4) and (5), respectively.

$$A = -\text{INT}[\text{MOD}[n \cdot \Phi1/\pi, 2] - 1] \cdot Vh \quad (4)$$

$$B = -\text{INT}[\text{MOD}[n \cdot \Phi1/\pi - 0.5, 2] - 1] \cdot Vh \quad (5)$$

In expressions (4) and (5), symbol INT[x] is a function which returns an integer obtained by rounding down decimal places of x. Symbol MOD [x,y] is a function which returns a remainder of x when divided by y. Symbol Vh is a voltage of the high level of a pulse. In such interpolation processing, the increment pulses A and B whose phases are shifted by 90 degrees from each other are obtained as a pulse train with n periods within one period of a sine wave. The increment pulses A and B obtained by the interpolation processor 102 are output from the increment pulse generator 104.

Figure 4:
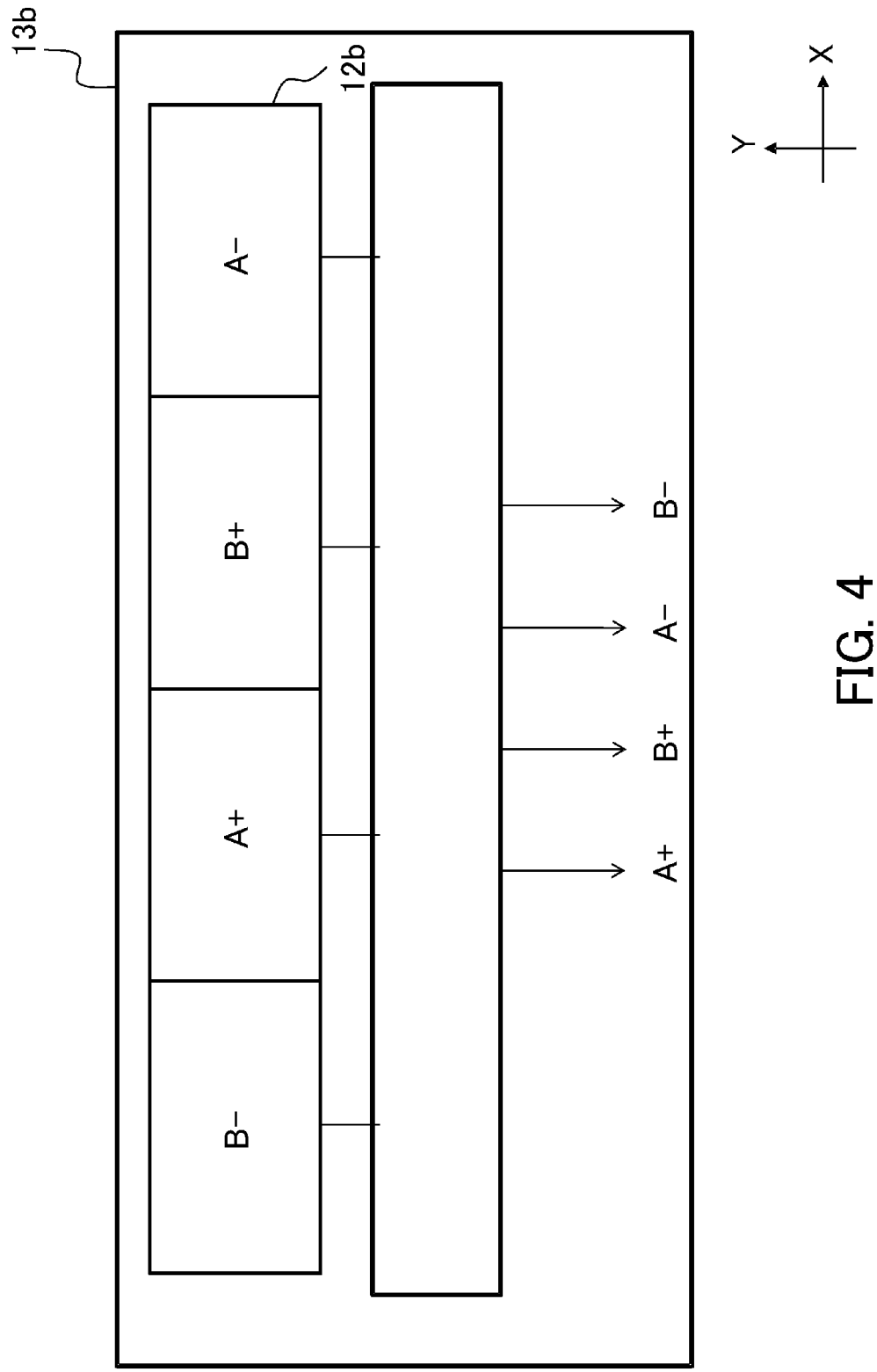
FIG. 4 is a plan view of the light receiving element array of the light receiving IC in each of the first and second embodiments.

Next, referring to FIG. 4, the arrangement of the light receiving element array 12b of the light receiving IC 13b will be described. FIG. 4 is a plan view of the light receiving element array 12b, and it illustrates the arrangement of a light receiving surface of the light receiving element array 12b. In the light receiving element array 12b, four light receiving elements are arrayed in the position detection direction (X direction) in line. An output (current) of each of the four light receiving elements is added to each other to be input to an I-V conversion amplifier (not illustrated) provided for each phase at the latter stage. Four I-V conversion amplifiers output four-phase signals S2(A+), S2(B+), S2(A−), and S2(B−), respectively.

Figure 5:
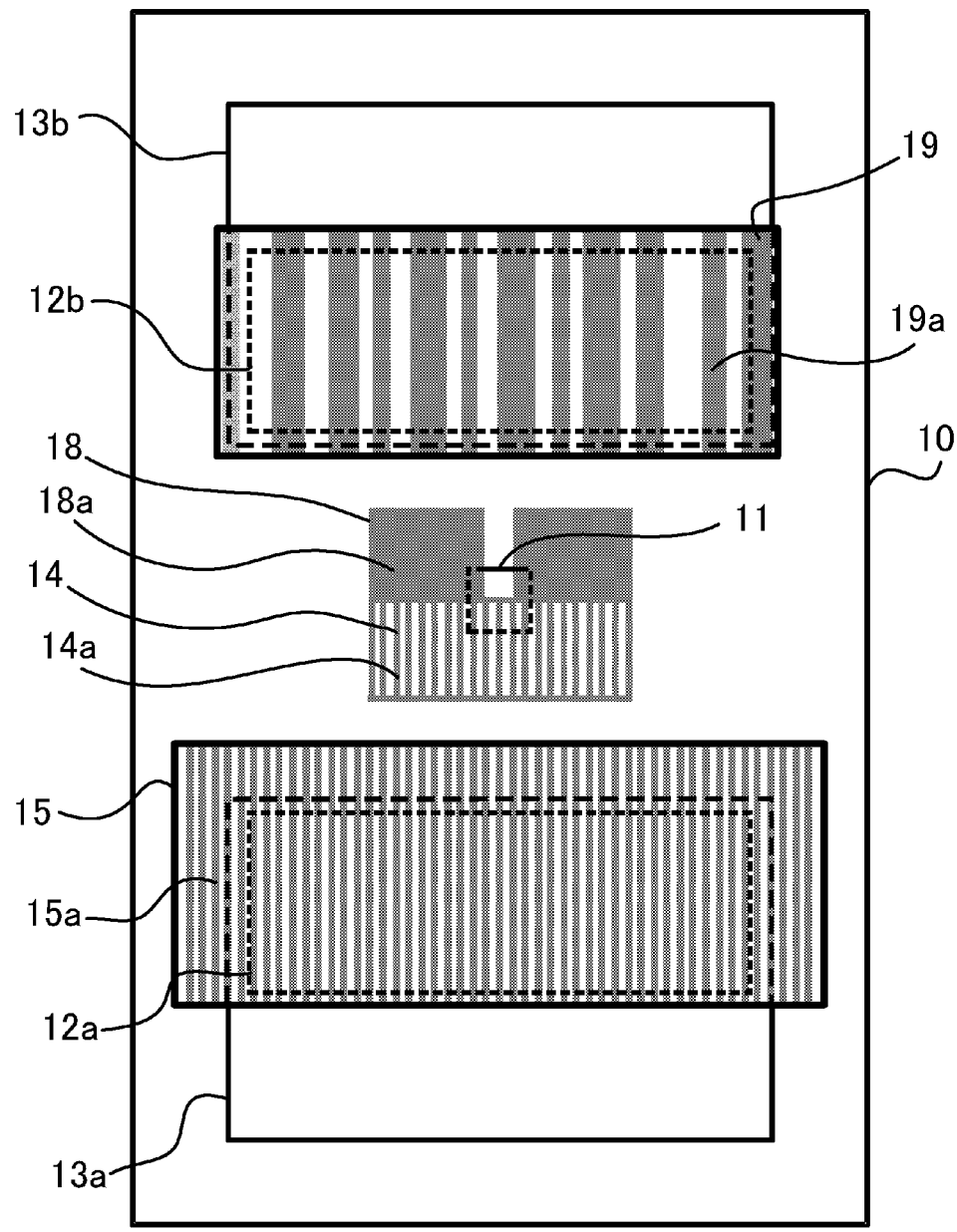
FIG. 5 is a plan view of a sensor unit in each of the first and second embodiments.
Figure 6:
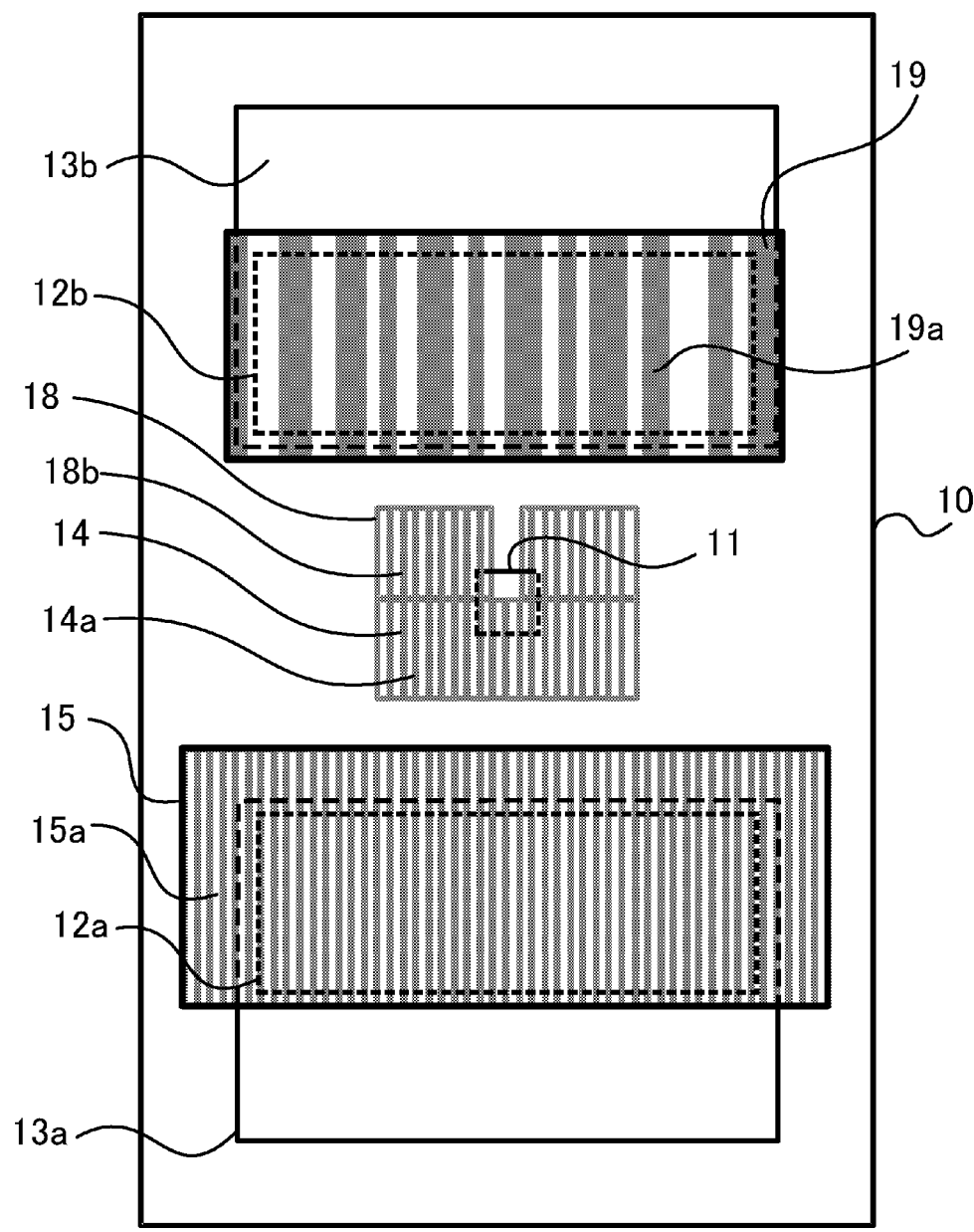
FIG. 6 is a plan view of a sensor unit in each of the first and second embodiments (modification).

Next, referring to FIGS. 5 and 6, the configuration of the sensor unit 10 will be described. FIGS. 5 and 6 are plan views of the sensor unit 10, and they illustrate views when the sensor unit 10 is seen from the scale 20. FIG. 6 is a modification of the sensor unit 10 illustrated in FIG. 5. A pitch P1 of a grating pattern 14a of the light source grating 14 is 4 μm. The detection grating 15 is provided with a grating pattern 15a with a pitch P3 (=4.069952 μm) in the position detection direction. The slit opening 18 has a light shielding film 18a (light shielding film slit) that restricts a transmissive region in the position detection direction. Alternatively, the slit opening 18 may have a grating pattern 18b in which the pattern of the light source grating 14 is extended, instead of the light shielding film 18a. In this case, the region other than the opening also functions as the light source grating 14, and therefore emitted light from the light source 11 can be used more efficiently.

The random grating 19 is provided with a random grating pattern 19a having a shape similar to the reference position mark 22 on the scale track 21b in the position detection direction. A projection magnification M of the reference position mark 22 with respect to a surface (area) of the random grating 19 can be represented as the following expression (6) by using a distance L1 from the slit opening 18 to the scale track 21b and a distance L2 from the scale track 21b to the random grating 19.

$$M = L1/L2 \quad (6)$$

While the scale track 21b and the random grating 19 have similar shapes each other, a ratio of their sizes in the position detection direction is 1:M×0.98. By shifting the ratio slightly from 1:M, the four-phase signals S2(A−), S2(B+), S2(A+), and S2(B−) become four solitary waves (waves each having a solitary pulse) whose peak positions are shifted at certain intervals.

The reference position detecting processor 103 performs calculation represented by the following expressions (7) and (8) on the four-phase signals S2(A+), S2(B+), S2(A−), and S2(B−) to generate two-phase signals S2(A) and S2(B) (two-phase S-shaped signals) in which direct-current (DC) components have been removed.

$$S2(A) = S2(A+) - S2(A-) - \Delta1 \quad (7)$$

$$S2(B) = S2(B+) - S2(B-) - \Delta2 \quad (8)$$

In expressions (7) and (8), symbols Δ1 and Δ2 are predetermined offset amounts, which may be zero. Each of the offset amounts Δ1 and Δ2 may be determined based on a design value. Alternatively, they may be acquired by scanning and learning for initialization or may be updated during an actual operation. It is preferred that the offset amounts Δ1 and Δ2 are determined so that for example each of the signals S2(A) and S2(B) is a value of zero or near zero in a region of the halftone 23.

The reference position detecting processor 103 performs calculation represented by the following expression (9) to acquire a sum signal SUM.

$$\text{SUM} = S2(A) + S2(B) \quad (9)$$

The reference position detecting processor 103 performs calculation represented by the following expression (10) to acquire a phase signal Φ2.

$$\Phi2 = A\,\text{TAN}\,2[S2(A), S2(B)] \quad (10)$$

In expression (10), symbol A TAN 2[Y,X] is an arctangent function that determines a quadrant to convert the phase into a phase of 0 to 2π.

The reference position detecting processor 103 may perform calculation represented by the following expression (11), instead of expression (10), to acquire the phase signal Φ2.

$$\Phi2 = S2(A)/S2(B) \quad (11)$$

Then, the origin pulse generator 105 determines whether both of conditions represented by the following expressions (12) and (13) are satisfied.

$$\text{SUM} > Th1 \quad (12)$$

$$Th2 < \Phi2 < Th3 \quad (13)$$

In expressions (12) and (13), each of symbols Th1, Th2, and Th3 is a threshold value (predetermined threshold value) which is previously stored. Each of the threshold values Th1, Th2, and Th3 can be determined based on a design value. Alternatively, they may be determined by scanning and learning for initialization or may be updated during an actual operation.

When both of the conditions represented by expressions (12) and (13) are satisfied, the origin pulse generator 105 outputs a signal (origin signal Z1 as an origin pulse) at a high level (Vh). On the other hand, when at least one of the conditions is not satisfied, the origin pulse generator 105 outputs a signal at a low level (0), i.e., it does not output the origin signal Z1 (origin pulse).

Figure 7A:
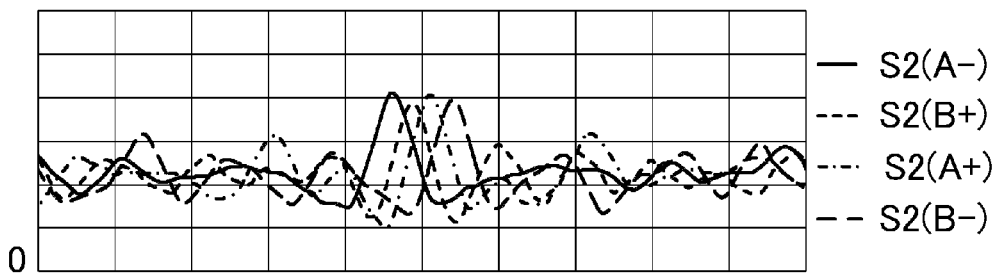
FIGS. 7A to 7E are diagrams of signal waveforms near a reference position mark in each of the first and second embodiments.
Figure 7B:
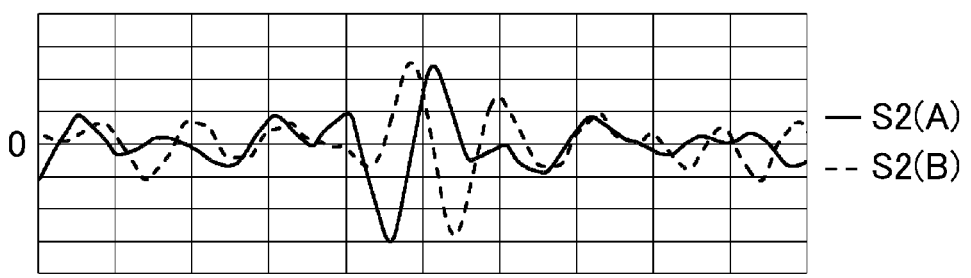
Figure 7C:
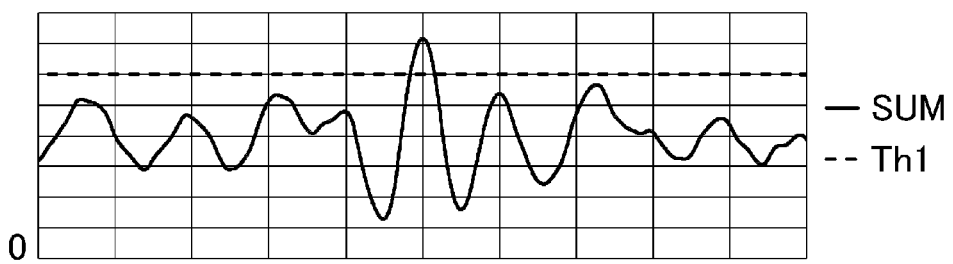
Figure 7D:
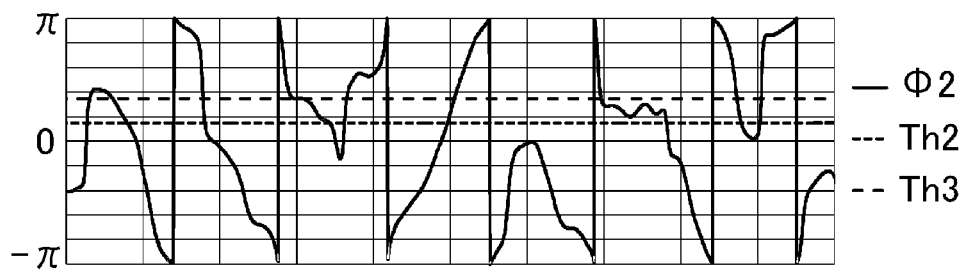
Figure 7E:

Next, referring to FIGS. 7A to 7E, each signal waveform near the reference position mark 22 will be described. FIGS. 7A to 7E are signal waveform diagrams near the reference position mark 22. FIG. 7A illustrates waveforms of the four-phase signals S2(A+), S2(B+), S2(A−), and S2(B−) near the reference position mark 22. FIG. 7B illustrates waveforms of the two-phase signals S2(A) and S2(B) near the reference position mark 22. FIG. 7C illustrates waveforms of the sum signal SUM and the threshold value Th1 near the reference position mark 22. FIG. 7D illustrates waveforms of the phase signal Φ2 and the threshold values Th2 and Th3 near the reference position mark 22. FIG. 7E illustrates a waveform of the origin signal Z1 (origin pulse) near the reference position mark 22. The two-phase signals S2(A) and S2(B) are similar (i.e. close) to a waveform obtained by cutting out a part of a sine wave. Accordingly, in performing the arctangent calculation by using expression (10), the two-phase signals S2(A) and S2(B) have high linearity with respect to a displacement, and they can be used easily when a width and a position of the origin signal Z1 are to be independently adjusted.

Figure 8:
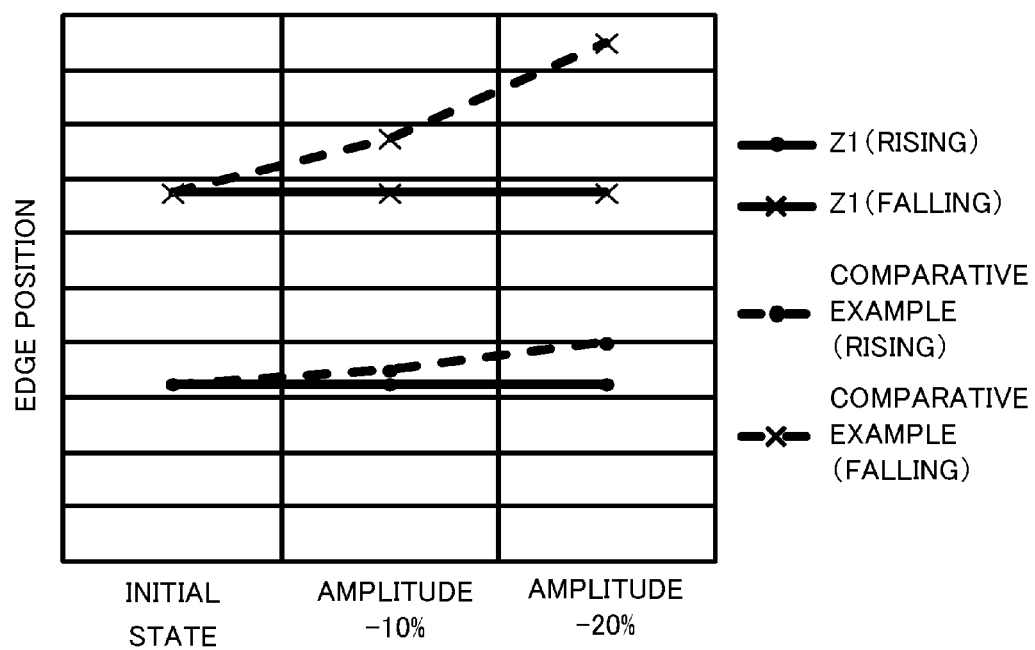
FIG. 8 is a diagram of illustrating a change of an edge position of an origin signal depending on a signal amplitude in each of the first and second embodiments.

Next, referring to FIG. 8, a change of an edge position of the origin signal Z1 when a signal amplitude is varied will be described. FIG. 8 is a diagram of illustrating a change of the edge position of the origin signal depending on the signal amplitude. Solid lines in FIG. 8 indicate the origin signals Z1 in this embodiment, and dashed lines in FIG. 8 indicates signals as a comparative example. In expression (10) or (11), a value of the phase signal Φ2 with respect to a displacement is approximately constant independently of the signal amplitude. Accordingly, the edge position of the origin signal Z1 (origin pulse) is not easily affected by the change of the signal amplitude. Furthermore, since the direct-current component is removed by the differential calculation represented by expressions (7) and (8), the influence is small even when the direct-current component of a light amount is varied.

As a comparative example, a case in which an origin pulse is generated by using two threshold values Th4 and Th5 for the level of the signal S2(A) will be described. The origin pulse generator outputs a signal at a high level when both of conditions represented by the following expressions (14) and (15) are satisfied, and on the other hand, it outputs an origin pulse signal Z1 (origin pulse) at a low level when at least one of the conditions is not satisfied.

$$SUM > Th1 \quad (14)$$

$$Th4 < S2(A) < Th5 \quad (15)$$

The threshold values Th4 and Th5 are set so that an edge position of the origin pulse is the same as that of the origin signal Z1 in an initial state in this embodiment. As indicated by the dashed lines in FIG. 8, for the comparative example, the edge position and the edge interval (interval between a rising edge and a falling edge) of the origin pulse change depending on the variation of the signal amplitude. On the other hand, as indicated by the solid lines in FIG. 8, the edge position and the edge interval of the origin signal Z1 in this embodiment are approximately constant (do not substantially change) even when the signal amplitude is varied.

As described above, according to this embodiment, high reproducibility can be maintained with respect to the edge generation position (edge interval) of the reference position pulse even when the signal amplitude and the direct-current component are changed due to various factors such as a change of intensity distribution characteristics caused by an environmental change or time degradation, a decrease of a light receiving efficiency, and a change of a reflectance. In this embodiment, a linear encoder is described as a position detection apparatus, but this embodiment is not limited thereto and it can be applied also to a rotary encoder. In this case, the scale pattern may be formed radially.

In this embodiment, the array in which the pseudo random code is replaced with the reflection portion and the non-reflection portion is used as the reference position mark 22, but the embodiment is not limited thereto. For example, a chirped grating pattern in which a grating period varies depending on a position, or the like can also be used. In this embodiment, while the random grating 19 and the light receiving element array 12b are configured separately from each other, the light receiving element array 12b may be the array similar to that of the random grating 19 to have a part of a function of the random grating 19. In this case, L2 in expression (6) is replaced with a distance from the scale track 21b to the light receiving element array 12b to obtain the projection magnification M. Similarly, in this embodiment, the light source 11 (light emitting device), the light source grating 14, and the slit opening 18 are separated from each other, but the embodiment is not limited thereto. Alternatively, they may be replaced with a point light source such as a semiconductor laser (laser diode) and a current constriction type LED.

In this embodiment, an example of an optical encoder is described as the position detection apparatus, but the embodiment is not limited thereto. The same effect can be achieved by using other types of encoders such as a magnetic encoder and an electrostatic capacitive encoder. When the magnetic encoder is used, a magnetic material is used for the scale, and the magnetic polarity distribution is formed with a shape similar to that of the reflection film of the scale of this embodiment. A position can be detected by using arrayed magnetic field detection elements provided near this scale. On the other hand, when the electrostatic capacitive encoder is used, a conductive electrode pattern is formed with a shape similar to that of the reflection film of the scale of this embodiment, and a position can be detected by another arrayed electrode pattern provided oppositely to the conductive electrode pattern.

Second Embodiment

Figure 9:
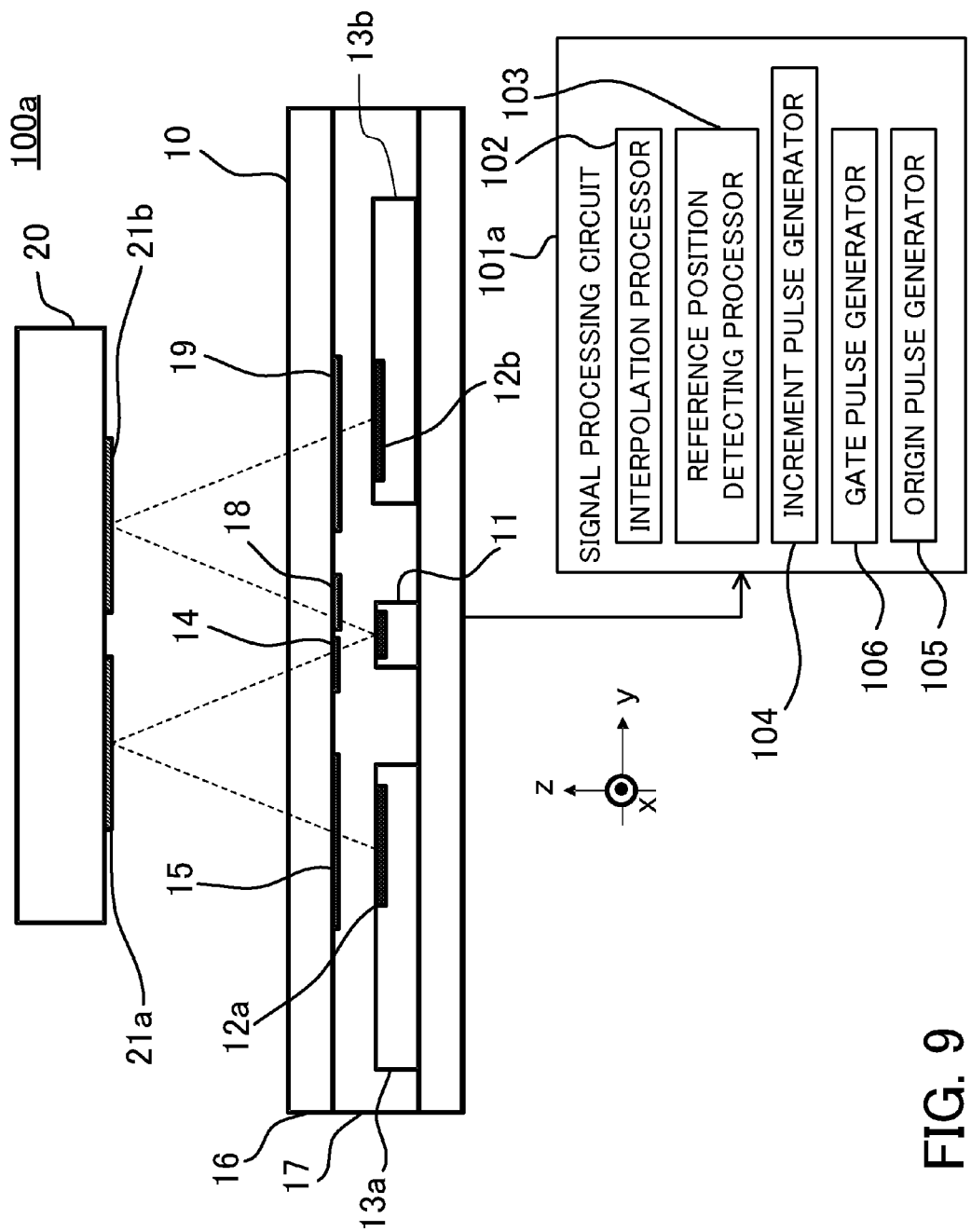
FIG. 9 is a configuration diagram of a position detection apparatus (optical encoder) in a second embodiment.

Next, referring to FIG. 9, a position detection apparatus (optical encoder) in a second embodiment will be described. FIG. 9 is a configuration diagram of a position detection apparatus 100a in this embodiment. The position detection apparatus 100a includes the scale 20, the sensor unit 10 (detector), and a signal processing circuit 101a (signal processor).

The signal processing circuit 101a includes the interpolation processor 102, the reference position detecting processor 103, the increment pulse generator 104, the origin pulse generator 105, and a gate pulse generator 106. In this embodiment, the interpolation processor 102 and the increment pulse generator 104 constitute a pulse generator, and the reference position detecting processor 103, the origin pulse generator 105, and the gate pulse generator 106 constitute a reference position generator. The gate pulse generator 106 restricts an output range of the origin signal Z1. The origin pulse generator 105 generates an origin pulse in synchronization with an edge of an interpolation pulse (specific adjacent edge), i.e., it performs synchronous processing.

Similarly to the first embodiment, when the number of division of the interpolation by the interpolation processor 102 is n, increment pulses A and B are processed as outputs represented by expressions (4) and (5), respectively. By performing the interpolation processing, the increment pulses A and B are obtained as a pulse train with n periods within one period of a sine wave. The increment pulses A and B are output from the increment pulse generator 104.

The gate pulse generator 106 determines whether both of the conditions represented by expressions (12) and (13) described in the first embodiment are satisfied. When both of these conditions are satisfied, the gate pulse generator 106 outputs a signal (gate pulse Z2) at a high level (Vh). On the other hand, when at least one of the conditions is not satisfied, the gate pulse generator 106 outputs a signal at a low level (0), i.e., it does not output the gate pulse Z2).

In expressions (12) and (13), each of symbols Th1, Th2, and Th3 is a threshold value (predetermined threshold value) which is previously stored. Each of the threshold values can be determined based on a design value, or alternatively, they may be determined by scanning and learning for initialization. Each threshold value may be updated during an actual operation. In this case, it is preferred that the threshold values Th2 and Th3 are set so that a width of the gate pulse Z2 at the high level are approximately equivalent to one period of the two-phase sine wave signals S1(A) and S1(B).

The origin pulse generator 105 determines whether the following expressions (16) and (17) are satisfied.

$$0+2\pi \times m/(4n) < \Phi 2 < \pi/(2n)+2\pi \times m/(4n) \quad (16)$$

$$Z2 > Vh/2 \quad (17)$$

When both of the conditions represented by expressions (16) and (17) are satisfied, the origin pulse generator 105 outputs a signal (origin signal Z1 as an origin pulse) at a high level (Vh). On the other hand, when at least one of the conditions is not satisfied, the origin pulse generator 105 outputs a signal at a low level (0), i.e., it does not output the origin signal Z1 (origin pulse). In expression (16), symbol m is an integer from 0 to n−1. The integer m is adjusted so that a margin with respect to the edge position of the gate pulse Z2 is maximized in the initial operation. Alternatively, the margin may be ensured by adjustments of the threshold values Th1, Th2, and Th3 while the integer m is set as a fixed value.

According to this embodiment, the origin signal Z1 (origin pulse) synchronized with a specific edge adjacent to each of the increment pulses A and B can be generated. In this case, in order to generate the origin pulse synchronized with the specific increment pulse, a position error of the edge of the gate pulse is permitted up to ±(P/2−P/8n) as a maximum value. In this embodiment, since the determination is performed by using an evaluation value of the ratio of the two-phase signals while the direct-current component is reduced in the gate pulse generation, the influence of the environmental variation is not easily received and the pulse position is stable. Since the position of the gate pulse is stabilized, a permissible amount of other error factors (such as a rotation attitude variation around a z-axis) can be increased. Particularly, it is effective when the pitch is narrowed (pitch P is decreased).

As described above, according to this embodiment, a stable pulse generation in which a gate pulse position does not vary with respect to a displacement can be achieved even when a modulation component or a direct-current (DC) component is varied due to an environmental variation or the like during a generation of the gate pulse which restricts the range of outputting the origin signal.

Third Embodiment

Figure 10:
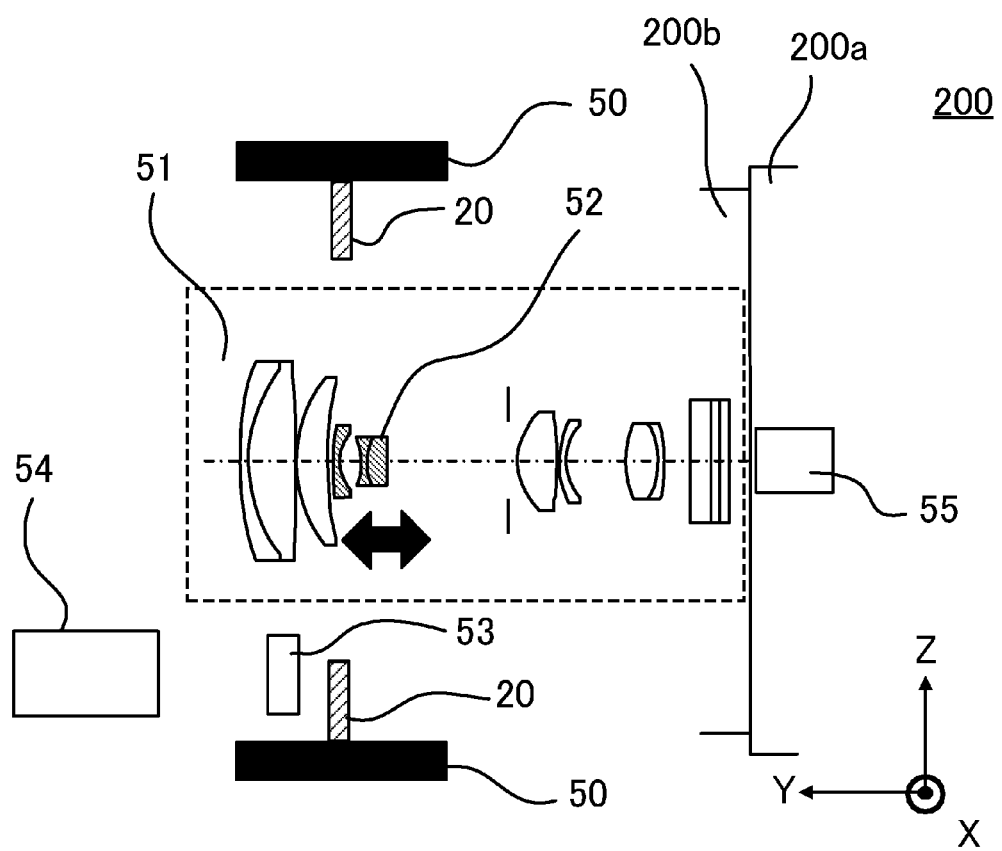
FIG. 10 is a schematic diagram of a cross section of an image pickup system in a third embodiment.

Next, referring to FIG. 10, a third embodiment of the present invention will be described. FIG. 10 is a schematic diagram of a cross section of an image pickup system 200 in this embodiment. The image pickup system 200 is an image pickup system which includes the encoder (position detection apparatus) in each embodiment described above in a lens apparatus. The image pickup system 200 includes an image pickup apparatus 200a and a lens apparatus 200b (a lens barrel including the encoder) which is removably mounted on the image pickup apparatus 200a. However, this embodiment can be applied also to an image pickup system which includes an image pickup apparatus and a lens apparatus integrated with each other.

In FIG. 10, reference numeral 53 denotes a sensor unit, and reference numeral 54 denotes a CPU. The sensor unit 53, the CPU 54, and the scale 20 constitute an encoder (corresponding to the position detection apparatus 100). In this embodiment, for example, the sensor unit 53 corresponds to the sensor unit 10 in each of the first and second embodiments, and the CPU 54 corresponds to the signal processing circuit 101 or 101a in each of the first and second embodiments. Reference numeral 51 denotes a lens unit, reference numeral 52 denotes a driven lens, reference numeral 55 denotes an image pickup element, reference numeral 50 denotes a cylindrical body, and an image pickup system is mainly constituted by them. The driven lens 52 (lens) constituting the lens unit 51 is for example an autofocus lens, and it is movable (displaceable) in a Y direction as an optical axis direction. The driven lens 52 may be other lenses such as a zoom lens to be driven. The cylindrical body 50 in this embodiment is coupled to an actuator (not illustrated) that drives the driven lens 52. The image pickup element 55 is provided in an image pickup apparatus 200a, which photoelectrically converts an optical image (object image) formed via the lens unit 51 (lens).

The lens apparatus 200b of this embodiment includes the driven lens 52 movable (displaceable) in the optical axis direction (Y direction) and the encoder (corresponding to the position detection apparatus 100) configured to detect a displacement of the driven lens 52. The scale 20 is attached to the cylindrical body 50. In this configuration, the encoder is a rotary encoder which acquires a rotation amount (displacement) around the optical axis direction of the cylindrical body 50 to detect the displacement of the driven lens 52 in the optical axis direction. In this embodiment, instead of the rotary encoder, a linear encoder that directly detects the displacement in the optical axis direction can be adopted.

The scale 20 is a rotary scale that includes a reflection pattern formed on a doughnut-shaped disk surface, and it is attached to the cylindrical body 50. In this embodiment, the scale 20 may also be a linear scale configured by forming a grating pattern on a film material. In this case, the scale 20 is applied to a cylindrical surface along a rotation direction of the cylindrical body 50.

When the cylindrical body 50 is rotated around the optical axis as a center by an actuator or by hand (manually), the scale 20 is moved (displaced) relatively to the sensor unit 53. The drive lens 52 is driven in the Y direction (arrow direction) as the optical axis direction depending on the displacement of the scale 20. The signal depending on the displacement of the drive lens 52 obtained from the sensor unit 53 of the encoder is output to the CPU 54. The CPU 54 generates a drive signal to move the drive lens 52 to a desired position. The drive lens 52 is driven based on the drive signal.

Fourth Embodiment

Next, a fourth embodiment of the present invention will be described. The reference position detecting processor 103 in this embodiment acquires a distance signal R by calculation represented by the following expression (18), instead of the sum signal SUM as described in the first embodiment.

$$R=\sqrt{S2(A)^2+S2(B)^2} \tag{18}$$

In expression (18), similarly to the first embodiment, symbols S2(A) and S2(B) are two-phase S-shaped signals, obtained by expressions (7) and (8), in which direct-current (DC) components have been removed. Other configurations in this embodiment are the same as those in the first embodiment, and accordingly descriptions thereof will be omitted.

The origin pulse generator 105 determines whether both of conditions represented by expression (13) described above and expression (19) described below are satisfied.

$$R>Th4 \tag{19}$$

In expression (19), symbol Th4 is a threshold value (predetermined threshold value) which is previously stored. When both of the conditions represented by expressions (19) and (13) are satisfied, the origin pulse generator 105 outputs a signal (origin signal Z1 as an origin pulse) at a high level (Vh). On the other hand, when at least one of the conditions is not satisfied, the origin pulse generator 105 outputs a signal at a low level (0), i.e., it does not output the origin signal Z1 (origin pulse).

Figure 11A:
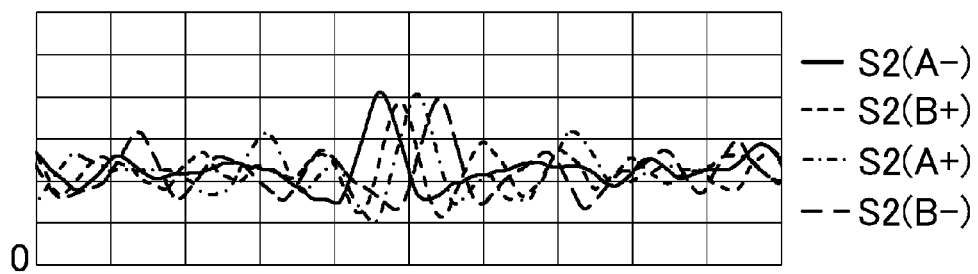
FIGS. 11A to 11E are diagrams of signal waveforms near a reference position mark in a fourth embodiment.
Figure 11B:
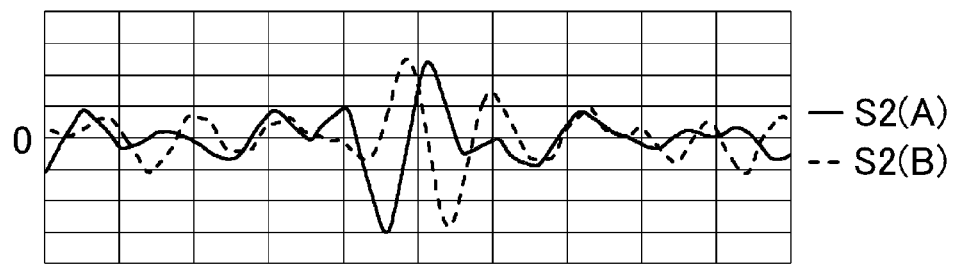
Figure 11C:
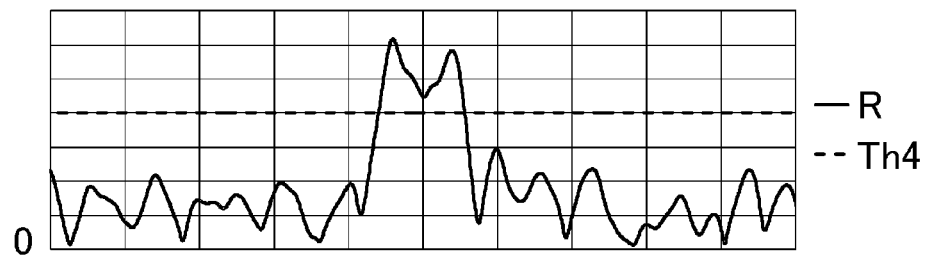
Figure 11D:
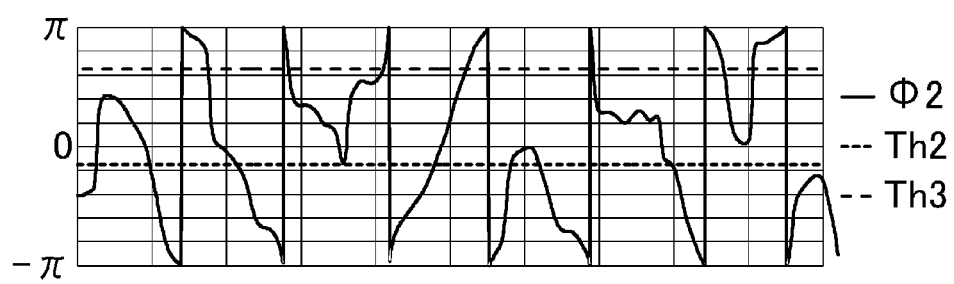
Figure 11E:

Next, referring to FIGS. 11A to 11E, each signal waveform near the reference position mark 22 will be described. FIGS. 11A to 11E are signal waveform diagrams near the reference position mark 22. FIG. 11A illustrates waveforms of the four-phase signals S2(A+), S2(B+), S2(A−), and S2(B−) near the reference position mark 22. FIG. 11B illustrates waveforms of the two-phase signals S2(A) and S2(B) near the reference position mark 22. FIG. 11C illustrates waveforms of the distance signal R and the threshold value Th4 near the reference position mark 22. FIG. 11D illustrates waveforms of the phase signal Φ2 and the threshold values Th2 and Th3 near the reference position mark 22. FIG. 11E illustrates a waveform of the origin signal Z1 (origin pulse) near the reference position mark 22.

The following can be recognized by comparing FIG. 7C with FIG. 11C. When the threshold value Th1 or Th4 is set so that a region other than the reference position mark 22 can be distinguished from the position of the reference position mark 22, a wider width at the high level can be obtained by using the distance signal R represented by expression (18) as an evaluation value of the reference for determination as described in this embodiment.

As described above, by using the distance signal R represented by expression (18), an erroneous generation of the origin pulse in the region other than the reference position mark 22 is prevented, and also a range of the threshold value (difference between the threshold values Th2 and Th3) of the phase signal Φ2 represented by expression (10) can be widened. Accordingly, offset variations of the four-phase signals S2(A+), S2(B+), S2(A−), and S2(B−) or an influence of a noise can be relatively reduced. Furthermore, a degree of freedom for design with respect to the width of the origin signal Z1 can be improved. When the configuration of this embodiment is applied to the reference position detecting processor 103 of the second embodiment, a degree of freedom for design with respect to the width of the gate pulse Z2 is improved, and accordingly a gate pulse width appropriate for the pitch P2 with a wider range on the scale track 21a can be set.

As described above, the position detection apparatus 100 in each embodiment detects a position of an object (which moves integrally with a scale or a detector), and it includes a scale 20, a detector (sensor unit 10), and a signal processor (signal processing circuit 101 or 101a). The scale has a periodic pattern. The scale and the detector are movable relatively to each other. The signal processor generates a reference signal (reference position signal, origin signal, or origin pulse) indicating a reference position of the scale based on a ratio of a first phase signal (signal S2(A)) and a second phase signal (signal S2(B)) from the detector.

Preferably, the signal processor compares an evaluation value generated based on the ratio of the first phase signal and the second phase signal with a predetermined threshold value (Th2, Th3) to generate the reference signal. More preferably, the predetermined threshold value is set so that a width of the reference signal (a length or a period of high level) is approximately equal to a period of a two-phase sine wave signal (signal S1(A), S1(B)) indicating position information of the object. The term "approximately equal" means a case evaluated as "substantially equal" in addition to a case of "exactly equal". Preferably, the signal processor performs arctangent calculation on the first phase signal and the second phase signal to calculate the evaluation value (phase signal Φ2). Preferably, the signal processor calculates, as a second evaluation value, a sum signal of the first phase signal and the second phase signal, and generates the reference signal based on the evaluation value (phase signal Φ2) and the second evaluation value (sum signal SUM). Preferably, the signal processor calculates, as a second evaluation value, a square root of a sum of a square of the first phase signal and a square of the second phase signal, and generates the reference signal based on the evaluation value and the second evaluation value. Preferably, the signal processor performs an offset adjustment on each of the first phase signal and the second phase signal. Then, the signal processor calculates, as a second evaluation value, a square root of a sum of a square of the adjusted first phase signal and a square of the adjusted second phase signal, and generates the reference signal based on the evaluation value and the second evaluation value.

Preferably, the signal processor performs the offset adjustment on each of the first phase signal and the second phase signal, and generates the reference signal based on the ratio of the adjusted first phase signal and the adjusted second phase signal.

Preferably, the detector outputs, according to a relative movement between the scale and the detector, a first solitary wave (S2(A−)), a second solitary wave (S2(B+)), a third solitary wave (S2(A+)), and a fourth solitary wave (S2(B−)) whose peak positions are shifted in sequence (in this order). Then, the signal processor acquires the first phase signal (first differential signal) by differential calculation of the first solitary wave and the third solitary wave, and acquires the second phase signal (second differential signal) by differential calculation of the second solitary wave and the fourth solitary wave.

Preferably, the signal processor includes a pulse generator (the interpolation processor 102 and the increment pulse generator 104) and a reference signal generator (the reference position detecting processor 103, the origin pulse generator 105, and the gate pulse generator 106). The pulse generator performs interpolation processing on a two-phase sine wave signal indicating position information of the object to generate a plurality of pulses (interpolation pulses) in a period of the two-phase sine wave signal. The reference signal generator generates the reference signal in synchronization with an edge of a pulse (at least one of a rising edge and a falling edge of the interpolation pulse) corresponding to a specific phase of the two-phase sine wave signal in the plurality of pulses. Preferably, the reference position is a position of a reference position mark which includes reflection portions and non-reflection portions formed at unequal intervals, and the position of the object is a position corresponding to a relative displacement between the detector and the scale with reference to the reference position.

The position detection apparatus in each embodiment can be applied also to various apparatuses other than the lens apparatus and the image pickup apparatus. For example, a machine tool apparatus that includes a machine tool including at least one of a robot arm and a conveyer configured to convey an object to be assembled, and the position detection apparatus in each embodiment which detects at least one of a position and an attitude of the machine tool is provided, and accordingly the position of the machine tool (robot arm or conveyer) can be detected with high accuracy. The position detection apparatus in each embodiment can be used in an exposure apparatus which exposes a semiconductor wafer to form an electronic circuit, and it can be used to detect a position of a stage which mounts the semiconductor wafer to be movable in a two-dimensional direction.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, a position detection apparatus, a lens apparatus, an image pickup system, a machine tool apparatus, an exposure apparatus, a position detection method, and a non-transitory computer-readable storage medium can be provided which are capable of detecting a reference position with high accuracy independently of environmental change or temporal change.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-006643, filed on Jan. 16, 2015 and Japanese Patent Application No. 2015-223899, filed on Nov. 16, 2015, which are hereby incorporated by reference herein in their entirety.

What is claimed is:

1. A position detection apparatus for detecting a position of an object, the position detection apparatus comprising:
   a scale having a periodic pattern and a reference position mark;
   a detector configured to detect the periodic pattern and the reference position mark, the scale and the detector being movable relatively to each other; and
   a signal processor configured to generate a reference signal indicating a reference position of the scale based on:
      a detection signal of the detector detecting the reference position mark; and
      a ratio of a first phase signal and a second phase signal generated by the detector upon detecting the reference position mark.

2. The position detection apparatus according to claim 1, wherein the signal processor compares an evaluation value generated based on the ratio of the first phase signal and the second phase signal with a predetermined threshold value to generate the reference signal.

3. The position detection apparatus according to claim 2, wherein the predetermined threshold value is set so that a width of the reference signal is equal to a period of a two-phase sine wave signal indicating position information of the object.

4. The position detection apparatus according to claim 2, wherein the signal processor is configured to perform arctangent calculation on the first phase signal and the second phase signal to calculate the evaluation value.

5. The position detection apparatus according to claim 2, wherein the signal processor is configured to:
   calculate, as a second evaluation value, a sum signal of the first phase signal, and the second phase signal, and
   generate the reference signal based on the evaluation value and the second evaluation value.

6. The position detection apparatus according to claim 2, wherein the signal processor is configured to:
   calculate, as a second evaluation value, a square root of a sum of a square of the first phase signal and a square of the second phase signal; and
   generate the reference signal based on the evaluation value and the second evaluation value.

7. The position detection apparatus according to claim 2, wherein the signal processor is configured to:
   perform an offset adjustment on each of the first phase signal and the second phase signal;
   calculate, as a second evaluation value, a square root of a sum of a square of the adjusted first phase signal and a square of the adjusted second phase signal; and
   generate the reference signal based on the evaluation value and the second evaluation value.

8. The position detection apparatus according to claim 1, wherein the signal processor is configured to:

perform an offset adjustment on each of the first phase signal and the second phase signal; and
generate the reference signal based on the ratio of the adjusted first phase signal and the adjusted second phase signal.

9. The position detection apparatus according to claim 1, wherein:
the detector is configured to output, according to a relative movement between the scale and the detector, a first solitary wave, a second solitary wave, a third solitary wave, and a fourth solitary wave whose peak positions are shifted in sequence, and
the signal processor is configured to:
acquire the first phase signal by differential calculation of the first solitary wave and the third solitary wave; and
acquire the second phase signal by differential calculation of the second solitary wave and the fourth solitary wave.

10. The position detection apparatus according to claim 1, wherein the signal processor includes:
a pulse generator configured to perform interpolation processing on a two-phase sine wave signal indicating position information of the object to generate a plurality of pulses in a period of the two-phase sine wave signal; and
a reference signal generator configured to generate the reference signal in synchronization with an edge of a pulse corresponding to a specific phase of the two-phase sine wave signal in the plurality of pulses.

11. The position detection apparatus according to claim 1, wherein:
the reference position is a position of a reference position mark including reflection portions and non-reflection portions formed at unequal intervals, and
the position of the object is a position corresponding to a relative displacement between the detector and the scale with reference to the reference position.

12. A lens apparatus comprising:
a lens movable in an optical axis direction; and
a position detection apparatus configured to detect a position of the lens,
wherein the position detection apparatus includes:
a scale having a periodic pattern and a reference position mark;
a detector configured to detect the periodic pattern and the reference position mark, the scale and the detector being movable relatively to each other; and
a signal processor configured to generate a reference signal indicating a reference position of the scale based on:
a detection signal of the detector detecting the reference position mark; and
a ratio of a first phase signal and a second phase signal generated by the detector upon detecting the reference position mark.

13. An image pickup system comprising:
a lens apparatus including:
a lens movable in an optical axis direction; and
a position detection apparatus configured to detect a position of the lens; and
an image pickup element configured to perform a photoelectric conversion on an optical image formed via the lens,
wherein the position detection apparatus includes:
a scale having a periodic pattern and a reference position mark;
a detector configured to detect the periodic pattern and the reference position mark, the scale and the detector being movable relatively to each other; and
a signal processor configured to generate a reference signal indicating a reference position of the scale based on:
a detection signal of the detector detecting the reference position mark; and
a ratio of a first phase signal and a second phase signal generated by the detector upon detecting the reference position mark.

14. A machine tool apparatus comprising:
a machine tool including at least one of a robot arm or a conveyer configured to convey an object to be assembled; and
a position detection apparatus configured to detect at least one of a position or an attitude of the machine tool,
wherein the position detection apparatus includes:
a scale having a periodic pattern and a reference position mark;
a detector configured to detect the periodic pattern and the reference position mark, the scale and the detector being movable relatively to each other; and
a signal processor configured to generate a reference signal indicating a reference position of the scale based on:
a detection signal of the detector detecting the reference position mark; and
a ratio of a first phase signal and a second phase signal generated by the detector upon detecting the reference position mark.

15. An exposure apparatus comprising:
a stage configured to mount a semiconductor wafer to be movable in a two-dimensional direction; and
a position detection apparatus configured to detect a position of the stage,
wherein the position detection apparatus includes:
a scale having a periodic pattern and a reference position mark;
a detector configured to detect the periodic pattern and the reference position mark, the scale and the detector being movable relatively to each other; and
a signal processor configured to generate a reference signal indicating a reference position of the scale based on:
a detection signal of the detector detecting the reference position mark; and
a ratio of a first phase signal and a second phase signal generated by the detector upon detecting the reference position mark.

16. A position detection method of detecting a position of an object that moves integrally with a scale or a detector based on an output signal from the detector, the scale having a periodic pattern and a reference position mark, and the scale and the detector being movable relatively to each other, the method comprising the steps of:
detecting the periodic pattern and the reference position mark;
acquiring a first phase signal and a second phase signal generated by the detector upon detecting the reference position mark; and
generating a reference signal indicating a reference position of the scale based on:
a detection signal of the detector detecting the reference position mark; and
a ratio of the first phase signal and the second phase signal.

17. A non-transitory computer-readable storage medium storing a program executable by a computer to execute a method of detecting a position of an object that moves integrally with a scale or a detector based on an output signal from the detector, the scale having a periodic pattern and a reference position mark, and the scale and the detector being movable relatively to each other, the process comprising the steps of:
- detecting the periodic pattern and the reference position mark;
- acquiring a first phase signal and a second phase signal generated by the detector upon detecting the reference position mark; and
- generating a reference signal indicating a reference position of the scale based on:
  - a detection signal of the detector detecting the reference position mark; and
  - a ratio of the first phase signal and the second phase signal.

* * * * *